Jan. 24, 1950  C. W. HOPKINS  2,495,329
METHOD OF GRINDING SCREW THREADS
Filed June 18, 1945  2 Sheets-Sheet 1

Inventor
CECIL W. HOPKINS
By Strauch & Hoffman
Attorneys

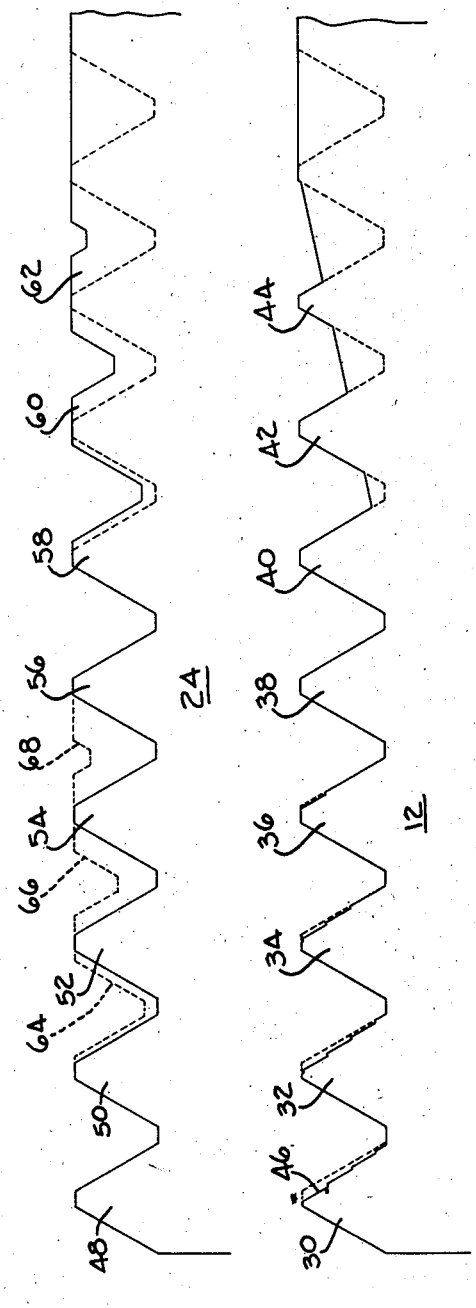

Patented Jan. 24, 1950

2,495,329

UNITED STATES PATENT OFFICE 2,495,329

METHOD OF GRINDING SCREW THREADS

Cecil W. Hopkins, Waynesboro, Pa., assignor to Landis Machine Company, Waynesboro, Pa., a corporation of Pennsylvania Application June 18, 1945, Serial No. 600,147

4 Claims. (Cl. 51—288)

This invention relates to grinding machines of the centerless type, in which the work piece is supported on a ledge between an abradant surface on a grinding wheel and a regulating or control wheel and is caused to rotate relatively to the grinding wheel and move axially through the grinding throat by the control wheel. The invention is particularly concerned with the production of screw threads and other helical surfaces by the centerless grinding method.

An object of the present invention is to provide a new method of operation whereby a screw thread may be accurately formed on a centerless grinding machine.

The grinding of screw threads upon a work piece by means of a centerless grinding machine was first suggested by Arthur Harold Lloyd who, in his United States Patent No. 2,010,730, dated August 6, 1935, disclosed one embodiment of such a machine in which the grinding wheel, the control wheel and the work supporting blade or ledge are mounted and arranged relative to each other in predetermined relationship with respect to the helix angle of the screw thread to be ground so as to cause the progressive axial travel of the work piece between the grinding and control wheels as it is revolved against the serrated face of the grinding wheel. While disclosed in a machine for the purpose of grinding preformed threads accurately to size in work pieces, the novel principles disclosed in said Patent 2,010,730 are applicable to the grinding of complete threads in the work piece.

It is the general object and purpose of the present invention to provide certain improvements in operation of the centerless thread grinding machines of the Lloyd patent whereby the screw thread may be formed with greater accuracy of helix or lead angle, pitch diameter and thread contour, and which is particularly adapted to the accurate grinding of complete threads in work pieces.

A further object of the invention is to provide a thread forming centerless grinding machine embodying certain novel structural features of the grinding wheel, to insure the accurate progressive formation of the thread.

Another object is to provide a method by which the proper relative angle of inclination between the axis of the work-piece and the axis of the regulating wheel is accurately determined in order to insure the required ratio of axial movement to each revolution of the work-piece.

Further objects and advantages of the invention will be apparent from consideration of the following description of the invention in conjunction with the annexed drawings.

In the drawings:

Figure 5 is a sectional profile of a screw thread formed by the grinding wheel shown in Figure 3, showing the result of possible slippage between work-piece and regulating wheel at the start of the operation.

Figure 6 is a view similar to Figure 5 of a screw thread formed by the grinding wheel shown in Figure 4.

Figure 1:
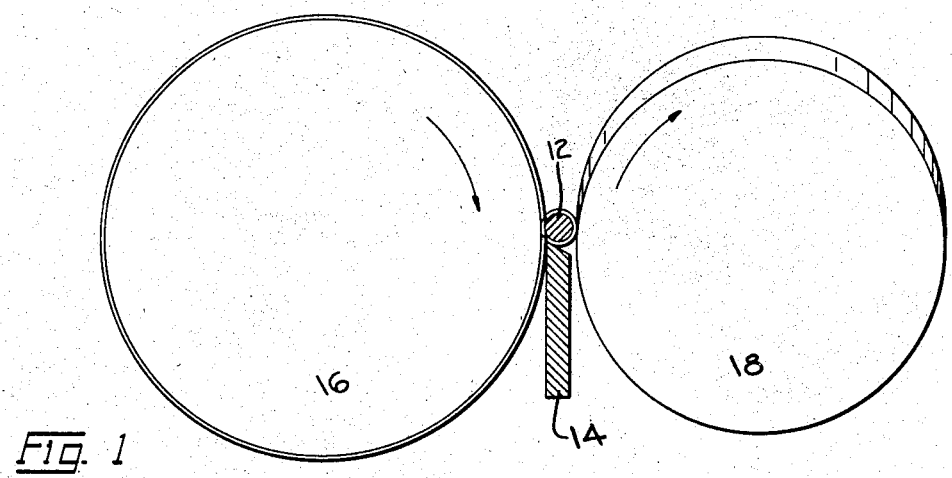
Figure 1 is an outline end elevation of the principal elements of the machine according to the invention.
Figure 2:
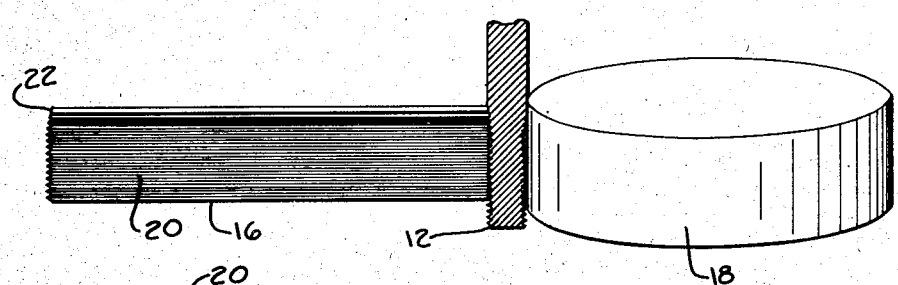
Figure 2 is a plan thereof.
Figure 3:
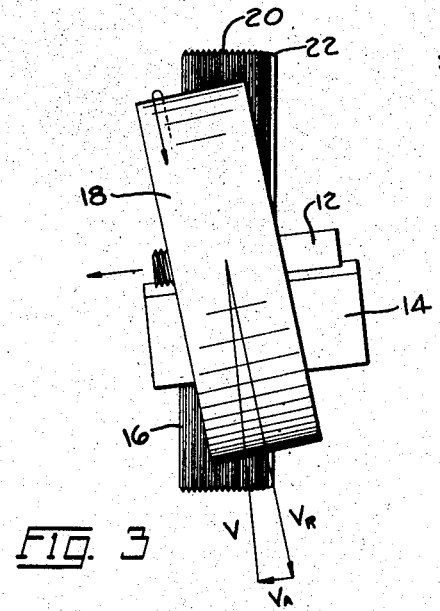
Figure 3 is a side elevation thereof.

As illustrated in Figures 1 to 3, the work piece 12 of cylindrical form is supported by a work rest 14 in the grinding throat formed by the converging opposed surfaces of grinding wheel 16 and regulating wheel 18. As taught by the above-identified Lloyd patent, the grinding wheel 16 is formed upon its periphery with a series of alternating ribs and grooves 20. The ribs and grooves 20 are annular and not in the form of a helix. Adjacent one side face of the grinding wheel 16 the ribs are truncated as at 22 to provide for a gradual grinding action upon the cylindrical work piece 12 as it enters the grinding throat from the side of the wheel.

It is a well known feature of centerless grinding that the work piece may be caused to move axially in the grinding throat during the grinding operation. This axial motion may be obtained by the relative inclination of the axes of work piece and regulating wheel and the direction of such motion is dependent upon the direction of rotation of the control wheel and the direction of inclination between the two axes.

In the production of screw threads this basic principle is utilized to move the work piece through the grinding throat at a rate such as to provide a linear displacement of the work piece equal to the pitch of the desired thread in one revolution of the work piece.

Moreover, in the grinding of screw threads or other helical surfaces it is desirable to incline the work piece 12 (Figure 3) relative to the axis of the grinding wheel 16 at an angle substantially equal to the helix angle of the thread. This inclination of the work piece relative to the axis of the grinding wheel is employed to prevent the ribs on the grinding wheel from interfering with the properly formed threads on the work piece at some point outside the area of grinding. When grinding threads in this manner it is necessary to alter the thread forms on the grinding wheel in order to produce a correct final form on the work piece, since the angularity of the flanks of the thread will be changed by varying the angle at which they are produced by the grinding wheel.

It follows, then, that when using the grinding method described in the preceding paragraph, an additional inclination of the regulating wheel 18 is required in order to move the work piece 12 axially at the desired rate. This condition is best shown in Figure 3. It will be noted that, relative to the work piece 12, the inclination of the grinding wheel 16 and regulating wheel 18 are opposite. It is possible, therefore, to maintain the axis of the grinding wheel 16 in a horizontal position, incline the axis of the work piece 12 to approximately the helix angle and incline the regulating wheel axis further in the same direction. While this arrangement is preferable, an alternative method is to maintain the axis of the work piece 12 in a horizontal position, incline the axis of the grinding wheel 16 an amount approximately equal to the helix angle in a direction dependent upon the "hand" of the thread to be produced and incline the axis of regulating wheel 18 in the opposite direction.

To determine the proper amount of inclination between work-piece and control wheel an understanding of the principle illustrated by the vector diagram in Figure 3 is necessary. The vector $V_R$ represents the distance traveled by a point on the regulating wheel in one revolution thereof. The value of $V_R$, therefore, may be expressed as $\pi D$, where D is equal to the diameter of the regulating wheel. The vector $V_A$ represents the axial movement of the work-piece in one revolution of the regulating wheel and is parallel to the axis of the work-piece making a right angle with the vector V drawn perpendicular to the work-piece axis. Now, obviously $V_A = V_R \sin \alpha$, where $\alpha$ is the angle between V and $V_R$, or, in other words, the amount of relative inclination between the work-piece and regulating wheel axes. Since $V_R = \pi D$, then $V_A = \pi D \sin \alpha$.

Also, it is evident that the velocity ratio between regulating wheel and work-piece is equal to $$\frac{\frac{D}{d}}{\cos \alpha}$$

or $$\frac{D \cos \alpha}{d}$$

where $d$ is the external diameter of the work-piece. Therefore, the axial movement of the work-piece in one revolution thereof ($Va$) is equal to $$\frac{V_A}{\frac{D \cos \alpha}{d}}$$

or $$\frac{d V_A}{D \cos \alpha}$$

Then, since $$V_A = \pi D \sin \alpha, \quad Va = \frac{d \pi D \sin \alpha}{d \cos \alpha} = \frac{\pi d \sin \alpha}{\cos \alpha} = \pi d \tan \alpha$$

Thus, it is seen that the proper angle of inclination of the regulating wheel relative to the work-piece is substantially equal to the angle made by the helix of the thread at the outer or major diameter of the work piece with a plane perpendicular to the axis of the work piece and is always somewhat less than the helix angle of the thread which is based upon the pitch diameter thereof. As will be noted from Figure 3, in setting the grinding and regulating wheels the angle of inclination between work-piece axis and regulating wheel axis must be added to the angle of inclination between work-piece axis and grinding wheel axis to determine the angle of inclination between regulating wheel axis and grinding wheel axis. I have discovered that such adjustment of the regulating wheel with respect to the grinding wheel and workpiece, rather than a helix angle adjustment, is a critical factor in producing the proper ratio of axial to rotative movement of the workpiece to obtain thread form and lead of maximum accuracy.

Figure 4:
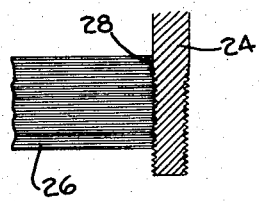
Figure 4 is a fragmentary view similar to a portion of Figure 3 but showing a different type of grinding wheel.

Figure 4 illustrates an alternate form of grinding wheel 26 in position for grinding threads upon a work-piece 24. The wheel 26 differs from grinding wheel 16 by virtue of the fact that the ribs 28 adjacent the side of the wheel at which the work-piece enters are, on grinding wheel 26, fully formed but successively decrease in diameter to the side face of the wheel.

It occasionally occurs in this type of grinding that the work-piece is introduced to the grinding wheel at a faster or slower rate of axial travel than is desired to form a thread of correct lead. The results of this condition are shown in Figures 5 and 6. In Figure 5 is shown a work-piece 12, formed by the grinding wheel 16 and which has been introduced into the grinding throat too rapidly. The teeth 30, 32, 34, 36, 38, 40, 42 and 44 have been formed on work-piece 12, teeth 30, 32 and 34 being imperfect and unfinished due to their having been formed by the truncated ribs 22 on grinding wheel 16. The regulating wheel, by forcing the axial speed of the work-piece to reduce the value which will produce correct lead on the screw thread, has caused the space between successive convolutions of the work-piece to increase between the first formed tooth 30 and tooth 38, where the correct value of lead and axial travel has been reached. It will be noted that the gradual increase in lead has resulted in the formation of ridges or steps on the flanks of the teeth of the work-piece 12 as at 46. It should be understood that if the initial axial speed of work-piece 12 were too slow the steps 46 would appear on the opposite flank of the thread.

The formation of steps 46 is objectionable and, while not often met in practice, may be eliminated by the use of a grinding wheel formed as shown in Figure 4. In Figure 6 is shown a work-piece 24 formed by the grinding wheel 26 and under the same conditions as applied to work-piece 12 shown in Figure 5. The teeth 48, 50, 52, 54, 56, 58, 60 and 62 have been formed on work-piece 24, teeth 58, 60 and 62 being unfinished due to the decreasing diameter of the ribs 28 on grinding wheel 26. The dotted line positions 64, 66, and 68 indicate the increase in lead which occurs when the axial speed of work-piece 24 is reduced to a normal value. It should be noted that in the case of the dotted line groove 68, which is typical of a first groove produced by grinding wheel 26 under such conditions and which departs farthest from the correct position, substantial material remains to be removed before the final desired surface of the finished groove is reached. As the groove successively deepens as at 66 and 64, it also more nearly approaches its correct horizontal position until the groove between the teeth 48 and 50 is reached when the grinding wheel 26 is grinding a full thread, and the axial speed of work-piece 24 has been brought to a normal value. Thus the final thread outline is produced by the first rib on grinding wheel 26 which extends to the maximum diameter of the grinding wheel, and no part of the finished thread is formed by the imperfect or deformed ribs which is the case when using the grinding wheel 16. Thus, a perfect thread profile may be formed which is free from objectionable grooves on its flanks.

From the above description it will be seen that I have materially improved the patented machine above referred to by setting or mounting the regulating or control wheel with its axis at a definitely predetermined angle to the axes of the work-piece and grinding wheel and which is based upon the external diameter of the work-piece and not upon the pitch diameter of the thread. In this way the rate of axial travel of the work piece in each revolution thereof is more accurately controlled so that the ribs on the grinding wheel will operate upon the work-piece to form a thread of substantially perfect contour having uniform lead and accurate pitch diameter and helix angle throughout the length thereof.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of accurately grinding screw threads, of predetermined lead on workpieces in a centerless grinding machine having a grinding wheel with annular ridges thereon, a control wheel peripherally opposed to said grinding wheel and spaced therefrom to form a grinding throat, and a work rest for supporting the workpiece for movement between the opposed portions of said wheels; which consists in arranging the axes of said wheels in substantially parallel planes, with the axis of the grinding wheel inclined in one direction with respect to the work rest at an angle thereto substantially equal to the helix angle of the thread and with the axis of the control wheel inclined in the opposite direction with respect to the work rest at the angle made by the helix of the thread at the outer diameter of the work piece with a plane perpendicular to the axis of the work piece, and with the peripheral faces of said wheels spaced from each other to provide a grinding throat, supporting a workpiece on the work rest with its axis substantially parallel with the top thereof, and simultaneously rotating and moving the work piece endwise in the grinding throat in predetermined timed relation to the rotation thereof for at least a sufficient distance to form the thread solely by the driving and controlling effect of the grinding and control wheels operating through their frictional contact with the work piece.

2. The method of accurately grinding a screw thread of predetermined lead on a work piece in a centerless grinding machine having a grinding wheel with annular ridges thereon, a control wheel peripherally opposed to said grinding wheel and spaced therefrom to form a grinding throat, and a work rest for supporting the work piece for movement between the opposed portions of said wheels; which consists in arranging the axes of said wheels in substantially parallel planes, with the axis of the grinding wheel inclined in one direction with respect to the work rest at an angle thereto substantially equal to the helix angle of the thread and with the axis of the control wheel inclined in the opposite direction with respect to the work rest at an angle substantially equal to angle made by the helix of the thread at the outer diameter of the work piece with a plane perpendicular to the axis of the work piece, and with the peripheral faces of said wheels spaced from each other to provide a grinding throat, supporting a work piece on the work rest with its axis substantially parallel with the top thereof, rotating the work piece on the work rest solely by the driving and controlling effect of the grinding in control wheels, and simultaneously moving the work piece endwise in the grinding throat in predetermined timed relation with the rotation thereof for a sufficient distance to form the thread, solely by the action of the grinding and control wheels operating through their frictional contact with the work piece.

3. The method of generating a screw thread of predetermined lead with maximum accuracy on a substantially cylindrical outer diameter of a work piece in a centerless grinding machine having a grinding wheel with annular ridges thereon, a control wheel peripherally opposed to said grinding wheel and spaced therefrom to form a grinding throat, and a smooth surface work rest for supporting the work piece for movement between the opposed portions of the wheels; which consists in arranging the axes of said wheels in substantially parallel planes with the axis of the grinding wheel inclined in one direction with respect to the work rest at an angle thereto substantially equal to the helix angle of the thread and with the axis of the control wheel inclined in the opposite direction with respect to the work rest at an angle thereto substantially equal to the angle made by the helix of the thread at the outer diameter of the work piece with a plane perpendicular to the axis of the work piece and with the peripheral faces of said wheels spaced from each other to provide a grinding throat, supporting a cylindrical work piece on the work rest with its axis substantially parallel with the smooth surface of the work piece of the work rest, and simultaneously rotating and moving the work piece endwise in the grinding throat in predetermined timed relation to the rotation thereof for a sufficient time to form the thread, solely by the driving and controlling effect of the grinding and control wheels operating through their frictional contact with the work piece.

4. The method of generating a screw thread of predetermined lead with maximum accuracy on a substantially cylindrical outer diameter of a work piece in a centerless grinding machine having a grinding wheel with annular ridges thereon, a control wheel peripherally opposed to said grinding wheel and spaced therefrom to form a grinding throat, and a smooth surface work rest for supporting the work piece for movement between the opposed portions of the wheels; which consists in arranging the axes of said wheels in substantially parallel planes with the axis of the grinding wheel inclined in one direction with respect to the work rest at an angle thereto substantially equal to the helix angle and with the axis of the control wheel inclined in the opposite direction with respect to the work rest at an angle thereto substantially equal to the angle made by the helix of the thread at the outer diameter of the work piece with a plane perpendicular to the axis of the work piece, and with the peripheral faces of said wheels spaced from each other to provide a grinding throat, supporting a cylindrical work piece on the work rest with its axis parallel with the smooth surface of the work piece, rotating the work piece on the work rest solely by the driving and controlling effect of the grinding in control wheels, and simultaneously moving the work piece endwise in the grinding throat in predetermined timed relation with the rotation thereof for a sufficient distance to form the thread solely by the action of the grinding and control wheels operating through their frictional contact with the work piece.

CECIL W. HOPKINS.

REFERENCES CITED

The following references are of record in the file of this patent:

UNITED STATES PATENTS

| Number | Name | Date |
|---|---|---|
| 1,528,188 | Frost | Mar. 3, 1925 |
| 1,579,934 | Heim | Apr. 6, 1926 |
| 1,702,160 | Hanson | Feb. 12, 1929 |
| 1,709,348 | Heim | Apr. 16, 1929 |
| 2,010,730 | Lloyd | Aug. 6, 1935 |
| 2,116,031 | Lindner | May 3, 1938 |

FOREIGN PATENTS

| Number | Country | Date |
|---|---|---|
| 516,259 | Great Britain | Dec. 28, 1939 |

OTHER REFERENCES

"Grinding Wheels and Their Uses," by Johnson Heywood, 1st edition, published 1938 by The Penton Publishing Co., Cleveland, Ohio, pages 215–217.

"Centerless Thread Grinding," published in April 1945 issue of Screw Machine Engineering.